United States Patent [19]

Weisang et al.

[11] 4,111,841

[45] Sep. 5, 1978

[54] CATALYSTS FOR THE HYDROTREATMENT OF HYDROCARBONS AND A PROCESS FOR PREPARATION AND APPLICATION OF SAID CATALYSTS

[75] Inventors: Joseph-Edouard Weisang; Philippe Engelhard, both of Le Havre, France

[73] Assignee: Compagnie Francaise de Raffinage, France

[21] Appl. No.: 549,845

[22] Filed: Feb. 13, 1975

[30] Foreign Application Priority Data

Feb. 13, 1974 [FR] France ................. 74 04895

[51] Int. Cl.$^2$ ................. B01J 27/04; B01J 27/08; B01J 27/10
[52] U.S. Cl. ................. 252/439; 252/441; 252/442; 208/139; 208/136
[58] Field of Search ................. 252/439, 441, 442; 208/136

[56] References Cited

U.S. PATENT DOCUMENTS

| | | | |
|---|---|---|---|
| 2,317,683 | 4/1943 | Greensfelder | 260/668 |
| 2,848,510 | 8/1958 | Myers et al. | 252/471 |
| 2,941,016 | 6/1960 | Schmetterling et al. | 260/673.5 |
| 3,033,780 | 5/1962 | McGrath et al. | 208/136 |
| 3,554,901 | 1/1971 | Kominami et al. | 208/136 |
| 3,700,588 | 10/1972 | Weisang et al. | 252/466 PT X |
| 3,702,294 | 11/1972 | Rausch | 252/441 X |
| 3,740,328 | 6/1973 | Rausch | 252/441 X |
| 3,806,446 | 4/1974 | Hayes | 252/439 X |
| 4,048,099 | 9/1977 | Hayes | 252/439 X |

*Primary Examiner*—Patrick Garvin
*Attorney, Agent, or Firm*—Curtis, Morris & Safford

[57] ABSTRACT

Novel hydrotreating catalysts, including methods of making and using same, which are a combination of platinum group metals with Sn and with Mn, Mo, and/or Cr, and optionally with a halogen and sulfur; on a refractory mineral oxide carrier.

25 Claims, No Drawings

CATALYSTS FOR THE HYDROTREATMENT OF HYDROCARBONS AND A PROCESS FOR PREPARATION AND APPLICATION OF SAID CATALYSTS

The present invention relates to catalysts for the hydrotreatment of hydrocarbons, and more particularly of petroleum fractions whose distillation range corresponds to that of gasolines and of naphtha. It also comprises a process for preparation of said catalysts.

In this specification and in the claims, "catalytic hydrotreating or hydroconversion processes" means processes applied to hydrocarbon charge stocks in the presence of hydrogen which entail isomerization, cyclization, dehydrocyclization and/or aromatization reactions. These reactions may be carried out separately or, as is the case with hydroreforming, simultaneously, which is particularly advantageous, as will be seen further on, with the catalysts in accordance with the invention. In the case of hydroreforming, one of the reactions — dehydrocyclization or hydroisomerization, for example — may preponderate, depending on the reaction conditions, the nature of the charge, and the nature of the catalyst.

It is a well-known fact that there is at present a great upsurge in catalytic hydrotreating processes for hydrocarbons. It is linked, on the one hand, to the need of the refineries for a source of gasoline of very high octane rating which is used either as is or, more generally, after being blended with a petroleum fraction having a nearby boiling range but a lower octane rating, and, on the other hand, the need of the petrochemical industry for a source of aromatic hydrocarbons, as these are the important raw materials of the plastics industry. The metals of group VIII of the periodic table, and particularly platinum, deposited on an acidic or weakly acidic refractory mineral carrier, are widely used as hydrotreating catalysts.

It is known that for the purpose of increasing the octane rating of the effluent obtained as well as the liquid yield, and particularly the yield in aromatic hydrocarbons, without having to appreciably raise the platinum content, bimetallic and trimetallic catalysts have come into use, among which might be mentioned, for example:

Pt-Sn, Pt-Pb, Pt-Ge, Pt-Re, Pt-Ir, Pt-Au, Pt-Cu, Pt-Sn-Re, Pt-Sn-Ir, Pt-Sn-Ge, Pt-Pb-Re, Pt-Ge-Re and Pt-Re-Ir.

By adding different metals, very interesting hydrotreating catalysts can be obtained.

Thus an object of the present invention is to produce catalysts for the hydrotreatment of hydrocarbons which result in a better octane rating for the effluent and give a higher liquid yield than is obtained when a catalyst is used which consists only of platinum or one or more platinum-group metals supported on a refractory mineral oxide carrier.

In this specification, "platinum-group metal" means one of the following metals: ruthenium, rhodium, palladium, osmium, iridium, and platinum.

A preferred embodiment of the present invention is a catalyst for the hydrotreatment of hydrocarbons comprising a refractory mineral oxide carrier and a halogen element present in combined form, said catalysts comprising in combination the following metals, in the free state or combined:

(a) From 0.02 to 2%, and preferably from 0.10 to 0.70%, on the basis of the total weight of the catalyst, of at least one metal from the platinum group;

(b) from 0.02 to 2%, and preferably from 0.02 to 0.60%, based on the total catalyst weight, of at least one metal from the group consisting of molybdenum, chromium and manganese;

(c) from 0.02 to 2%, and preferably from 0.05 to 1.00%, based on the total catalyst weight, of tin; and (d) possibly from 0.05 to 0.5% of sulfur, based on the total catalyst weight.

The invention relates more particularly to catalysts as defined above and in which (1) said carrier has a specific surface greater than 15 $m^2$ per gram and a specific pore volume greater than 0.1 $cm^3$ per gram, and (2) the halogen content is comprised between 0.4 and 2% and preferably between 0.5 and 1.6%, based on the total catalyst weight.

A further preferred embodiment of the present invention is a process for preparation of the hydrotreating catalysts defined above, said process being of the type involving at least one impregnation of the porous carriers with at least one solution containing at least one of the elements to be deposited. At least one of the impregnating solutions for said process comprises either cations formed from molybdenum and/or chromium and/or manganese elements, or anions containing molybdenum and/or chromium and/or manganese elements.

Another embodiment of the present invention is an improvement to the process of preparation described above, said improvement comprising subjecting the catalysts to a reduction and possibly a sulfurization before they are used.

Lastly, still another embodiment of the invention is the application of the catalysts defined above to the reforming of a hydrocarbon charge.

The carriers of the catalysts in accordance with the invention are the refractory materials customarily employed with hydrotreating catalysts. They have adequate specific surface and specific pore volume, the specific surface preferably comprising between 15 and 350 $m^2$ per gram, preferably between 100 and 350 $m^2$ per gram, and the specific pore volume being greater than 0.1 $cm^3$ per gram. These materials, moreover, may be acidic or weakly acidic (acid sites), either in the sense of Bronsted or in the sense of Lewis. The measure of the acidity of the carrier characterizes the presence and magnitude of these sites. (Hugues, White, and White Journal of Catalysis, 1969, vol. 13, pages 58–64; Tanaka and Ogagawa, Journal of Catalysis, 1970, vol. 16, pages 157–163). Alumina and the aluminosilicates, for example, are well suited.

The catalysts may be prepared by techniques for impregnation of a carrier by means of a solution containing the elements to be deposited. The various metals may be deposited in any desired order. However, the applicant has found that the platinum group metal is advantageously deposited after the tin. Thus it will be preferable:

either to deposit the tin and then at least one metal from the group consisting of chromium, manganese and molybdenum, and lastly at least one of the platinum-group metals, in which case the two last-mentioned depositions may be made simultaneously, if desired, or to deposit at least one metal from the group consisting of chromium, manganese and molybdenum, and then the tin, and after that at least one of the platinum-group metals, in which case the two first-mentioned depositions may be made simultaneously, if desired. However, it will be preferable to first deposit the tin.

After each deposition of a metal other than one of the platinum-group metals, the solid obtained may be calcined at a temperature comprised between 400° and 700° C., and preferably between 500° and 600° C. Following the deposition of at least one of the platinum-group metals, the catalyst obtained is calcined, preferably at a temperature below 530° C.

The most advantageous catalysts are those whose contents in platinum-group metals, tin, and metals from the group consisting of molybdenum, chromium and manganese are comprised between 0.02 and 2%, and preferably between 0.10 and 0.70%; between 0.02 and 2%, and preferably between 0.05 and 1%; and between 0.02 and 2%, and preferably between 0.02 and 0.60%, respectively, these percentages being based on the total weight of the catalyst.

The platinum-group metal content is that which is usually employed in multimetallic catalysts for the hydrotreatment of hydrocarbons. To secure satisfactory catalytic properties, the content in this type of metal is preferably greater than 0.10%; however, for catalyst-cost reasons, said content usually is limited to 0.70%.

Similarly, the metal content of the group consisting of molybdenum, chromium and manganese is between 0.02 and 2%. Below 0.02%, the improvement in the properties of the usual catalyst containing only a metal such as platinum supported on a porous carrier is not appreciable; nor is it worthwhile above 2%. The applicant has further found that the most efficacious contents are those comprised between 0.02 and 0.60%, as no further improvement in catalytic properties is observed above 0.60%.

The same applied to the tin. The content in this metal may range from 0.02 to 2%; however, a content comprised between 0.05 and 1% is the most advantageous.

The halogen content of the catalyst is well known in the art. It may range from 0.4 to 2%, but the best results are obtained with halogen contents between 0.5 and 1.6%, chlorine being the preferred halogen.

The acidity of the carrier may be altered prior to deposition of the elements, or between the depositions when they are not simultaneous. In particular, the carrier on which the molybdenum and/or the manganese and/or the chromium and the tin have been deposited may be subjected to a treatment with an acid — hydrochloric acid, for example — before or during the deposition of a platinum-group metal. In the case of manganese, however, it is preferable to effect the acid treatment only just before the manganese is deposited. Said acid treatment will be described further on in conjunction with the examples.

The applicant has found that in the impregnating solution containing the elements of molybdenum and/or manganese and/or chromium, and in that containing tin, these elements may be present in different states. Thus, they may be present as cations at a degree of oxidation which is stable under the operating conditions and in the working medium, for example, $Cr^{3+}$ or $Mn^{2+}$. They may also enter into the formation of anions, such as $CrO_4^{2-}$ or $MnO^-_4$, for example.

The tin may be deposited by means of stannous chloride or stannic chloride solutions, for example.

The halogen present in the catalyst in accordance with the invention will generally be chlorine in combined form.

The applicant has further found that the stability with time of the catalytic properties may be considerably improved by having the catalyst undergo a treatment before it is used. Such treatment consists in carrying out a reduction at about 500° C., as is done with most catalysts for the hydrotreatment of hydrocarbons, and a sulfurization of the catalysts, which may be effected at a temperature ranging from 350° to 400° C. with sulfurized hydrogen diluted in hydrogen, with low-molecularweight mercaptans, or with organic sulfurs, for example. This treatment is most worthwhile on the industrial scale as it has the effect of prolonging the service life of the catalyst without its having to be regenerated by the means known in the art. The catalysts so treated may contain from about 0.05 to 0.5% of sulfur, based on the elemental state, in relation to the total catalyst weight.

The present invention is illustrated by the examples which follow and which are not intended to be limitative. Most of these examples relate to hydroreforming of normal heptane. However, this particular charge stock does not constitute a limitation of the field of application of the catalysts in accordance with the invention, which may be used successfully, for example, in hydroreforming a hydrocarbon charge whose boiling temperature is comprised between 35° and 250° C. and whose sulfur content is under 10 ppm and, if possible, under 1 ppm, as will be seen in the second part of Example III.

EXAMPLE I

An alumina is used in the form of extrusions whose characteristics are as follows:

| | |
|---|---|
| Average diameter of extrusions | 1.5 mm |
| Specific surfaces | 190 m²/g |
| Pore volume | 0.51 cm³/g |
| Average pore radius | 53 A |
| Chlorine content (measured by x-ray fluorescence) | 0.5% by weight of alumina |

This alumina is calcined for four hours at 600° C. and will be used as a carrier for the catalysts prepared and tested in this example. This example involves the preparation of a control catalyst T and of the three catalysts I, II, and III.

PREPARATION OF CONTROL CATALYST T 100 g of the above alumina is immersed in 250 cc of an 0.1 N solution of hydrochloric acid. After dewatering at ordinary temperature, the alumina is contacted with a circulating solution of hexachloroplatinic acid whose initial platinum concentration is such that the catalyst contains from 0.35 to 0.40% by weight of platinum.

After dewatering followed by drying at 100° C., the solid is calcined at 530° C. in a muffle kiln. The catalyst so obtained contains 0.35% by weight of platinum.

PREPARATION OF CATALYST I 100 grams of alumina carrier on which 0.20% by weight of tin has first been deposited is immersed in 125 cc of a solution containing 10 cc of hydrochloric acid R.P. To this, 125 cc of a solution which likewise contains 10 cc of hydrochloric acid R.P. as well as 0.368 g of ammonium paramolybdate is added to give the desired molybdenum content in the final catalyst. The alumina granules are dewatered, dried, precalcined for two hours at about 350° C., then calcined at 600° C. for two hours in a muffle kiln. The calcining temperature should preferably be above 500° C. The solid obtained is then treated with 250 cc of an 0.1 N solution of hydrochloric acid, then contacted with a solution of hexachloroplatinic acid whose initial platinum concentration is such that the final catalyst always contains from 0.35 to 0.40% by weight of platinum. After dewatering followed by drying at 120° C., the solid is calcined for 2 hours at 530° C. in a muffle kiln.

In this way, catalyst I is obtained. Its composition is given in Table I.

PREPARATION OF CATALYST II

The tin and the chromium are deposited simultaneously on the alumina carrier. To this end, 100 g of alumina carrier is immersed in a solution containing 0.461 g of chromium chloride $CrCl_3.6H_2O$ and 0.380 g of stannous chloride $SnCl_2.2H_2O$, dissolved in 115 cc of water and 10 cc of hydrochloric acid R.P.

The rest of the preparation procedure (drying and calcining steps and deposition of the platinum) is identical in every respect with that of catalyst I.

PREPARATION OF CATALYST III 100 g of alumina carrier which already contains the tin (deposited by impregnation) is immersed in an 0.1 N hydrochloric acid solution containing 0.912 g of manganese nitrate and such an amount of hexachloroplatinic acid that the final catalyst obtained contains from 0.35 to 0.40% by weight of platinum.

The solid obtained is dewatered, dried at 120° C., then calcined at 530° C. Catalyst III contains tin, manganese, and platinum. Its composition is given in Table I.

TABLE I

| Composition of Catalysts T, I, II and III | | | | | | |
|---|---|---|---|---|---|---|
| Designation of catalysts | Pt % | Cl % | Mn % | Cr % | Mo % | Sn % |
| T | 0.35 | 1.45 | — | — | — | — |
| I | 0.39 | 1.21 | — | — | 0.24 | 0.20 |
| II | 0.39 | 1.13 | — | 0.07 | — | 0.21 |
| III | 0.38 | 1.40 | 0.15 | — | — | 0.21 |

Catalytic tests are then run as described below: A gas stream of hydrogen and normal heptane is passed, at a temperature of about 520° C. and under atomspheric pressure, over 2 cm³ of catalyst placed in a small reactor. The sulfur content of the n-heptane is under 1 ppm. The hourly space velocity of the gas mixture, usually expressed as v/v/hr liquid (volume velocity per hour, measured in the liquid state, volume of charge passing per hour per unit of volume of catalyst), is 0.5. The hydrogen/heptane ratio in the gas stream is 18:1. The reactor effluent is analyzed by chromatography in the gaseous phase.

The results obtained with catalysts T, I, II and III are shown in Table II.

TABLE II

| Catalyst | Characteristic values of effluent (Wt. % of charge) | Operating time (hours) | | |
|---|---|---|---|---|
| | | 1 | 3 | 5 |
| | $C_1$ to $C_4$ | 42.4 | 40.3 | 39.2 |

TABLE II-continued

| Catalyst | Characteristic values of effluent (Wt. % of charge) | Operating time (hours) | | |
|---|---|---|---|---|
| | | 1 | 3 | 5 |
| T | $iC_5$ to $iC_7$ | 1.3 | 4.1 | 7.5 |
| | Aromatics | 56.3 | 55.3 | 52.1 |
| | $C_1$ to $C_4$ | 16.3 | 16.55 | 16.00 |
| I | $iC_5$ to $iC_7$ | 3.7 | 4.45 | 4.00 |
| | Aromatics | 80.0 | 79.0 | 80.0 |
| | $C_1$ to $C_4$ | 17.1 | 9.9 | 9.3 |
| II | $iC_5$ to $iC_7$ | 2.0 | 2.7 | 2.5 |
| | Aromatics | 80.9 | 87.4 | 88.2 |
| | $C_1$ to $C_4$ | 10.0 | 6.5 | 8.0 |
| III | $iC_5$ to $iC_7$ | 2.5 | 2.5 | 2.0 |
| | Aromatics | 87.5 | 91.0 | 90.0 |

The table shows, for each catalyst and after 1, 3 and 5 hours of operation, the values of
- the composition of the effluent in hydrocarbons having four or less carbon atoms, this value being representative of the cracking of the charge;
- the fraction $iC_5$ to $iC_7$ in the effluent (light liquids); and
- the composition of the effluent in aromatic hydrocarbons, which is representative of the acitivity of the catalysts for the reforming of hydrocarbons.

It is apparent that the three catalysts I, II and III are good reforming catalysts. It is further seen that, under the conditions selected, catalyst I has slightly greater cracking activity than catalysts II and III.

EXAMPLE II

In this example, catalytic tests are run under hydrogen pressure and the following conditions:

25 cm³ of catalyst is placed in a stainless-steel reactor and a stream of pure and dry hydrogen is passed over the catalyst for two hours, the temperature of the latter being maintained at about 500° C. and the pressure in the reactor being maintained at 7 bars. The charge consisting of normal heptane is then introduced with an hourly space velocity of 2 and a ratio of moles of hydrogen introduced to moles of normal heptane introduced of 5.

Samples taken from the reactor effluent permit determination, on the one hand, of the liquid yield, by simple weighing, and, on the other hand, of the equivalent octane number of the liquid, by applying to chromatographic analyses of said liquid the ASTM blend numbers appearing in the graphs with which those skilled in the art are familiar.

The tests are performed at a fixed octane number, that is to say, as soon as a decrease in octane number is observed, the reactor temperature is raised in order to bring the octane number again to the level originally selected.

The variation of the reactor temperature as a function of time closely resembles a straight line whose slope is measured. The milder the slope of the straight line, the better the catalyst, as the temperature then need to be adjusted only very slightly in the course of time to secure the desired octane number. By the same token, the limiting temperature of use is reached more slowly and the duration of the service cycle is lengthened, which is a decided advantage in industrial applications.

Table III shows the results of the tests so performed with catalysts T, I, II and III for three octane numbers selected at the outset.

TABLE III

| Designation of catalyst | Octane number selected | Initial temperature (° C) | Temperature gradient as a function of time | Average yield (%) |
|---|---|---|---|---|
|   | 98  | 495 | 0.333 | 55.7 |
| T | 103 | 499 | 0.343 | 61.0 |
|   | 108 | 507 | 0.310 | 55.8 |
|   | 98  | 502 | 0.105 | 60.2 |
| I | 103 | 509 | 0.100 | 58.5 |
|   | 108 | 511 | 0.291 | 54.8 |
|   | 98  | 497 | 0.074 | 60.15 |
| II | 103 | 510 | 0.056 | 60.9 |
|   | 108 | 510 | 0.086 | 58.5 |
|   | 98  | 502 | 0.070 | 59.9 |
| III | 103 | 509 | 0.082 | 60.2 |
|   | 108 | 515 | 0.132 | 60.0 |

The results reported in this table show that the catalysts in accordance with the invention are very good reforming catalysts. In particular, the liquid yield is high and the slope of the straight line representing the temperature as a function of time is very mild by comparison with a conventional platinum catalyst.

EXAMPLE III

The purpose of this example is to show the effect of a sulfurization on the performance of the catalysts in accordance with the invention. To this end, catalysts containing the metals platinum, tin, molybdenum or manganese or chromium are sulfurized before being used in the hydrotreatment of a hydrocarbon charge. A gas stream of sulfurized hydrogen and hydrogen in the volume ratio of ⅓ and ⅔, respectively, is then passed over these solids at an average rate of about 5 to 6 liters per hour for four hours and at a temperature of about 370° C.

The analysis of the catalysts is given in Table IV, the percentages being weight percent.

TABLE IV

| Catalyst | Pt % | Cl % | Mn % | Cr % | Mo % | Sn % | S % |
|---|---|---|---|---|---|---|---|
| IV | 0.35 | 1.41 | — | — | 0.24 | 0.20 | 0.18 |
| V | 0.35 | 1.30 | 0.15 | — | — | 0.20 | 0.08 |
| VI | 0.35 | 1.25 | — | 0.08 | — | 0.20 | 0.07 |

With catalysts IV, V and VI, an atmospheric test identical in all respects with the one of Example I is then performed and the characteristic values of the effluent are measured at the end of 1, 3, and 5 hours of operation. The results of the various analyses are given in Table V.

TABLE V

| Catalyst | Characteristics values of effluent (Wt. %) | Operating time (hours) 1 | 3 | 5 |
|---|---|---|---|---|
| IV | $C_1$ to $C_4$ | 19.2 | 16.8 | 16.9 |
|    | $iC_5$ to $iC_7$ | 4.1 | 4.5 | 5.3 |
|    | Aromatics | 76.7 | 78.7 | 77.8 |
| V  | $C_1$ to $C_4$ | 7.4 | 5.8 | 4.7 |
|    | $iC_5$ to $iC_7$ | 1.7 | 1.5 | 1.2 |
|    | Aromatics | 90.7 | 92.7 | 94.1 |
| VI | $C_1$ to $C_4$ | 6.9 | 4.0 | 4.5 |
|    | $iC_5$ to $iC_7$ | 1.3 | 0.8 | 0.9 |
|    | Aromatics | 91.8 | 95.2 | 94.6 |

It is apparent that the performance of these three catalysts is very good.

Moreover, a pressure test was run with catalyst IV under conditions identical in every respect with those of Example II, except for - the temperature, which here is only 480° C., and the charge, which is a charge of hydrocarbons whose initial point (distillation) is 76° C. and whose end point is 151° C., the PNA composition of the charge, expressed in weight percent, being as follows:

| Paraffins | 67.0% |
|---|---|
| Naphthenes | 23.0% |
| Aromatics | 10.0% |
| Sulfur | 0.5 ppm |
| Density of charge | 0.727 |

The liquid effluent was analyzed and the equivalent octane number calculated (from graphs with which those skilled in the art are familiar). Table VI shows the evolution of the equivalent octane number as a function of test duration as well as the evolution of the liquid yield.

TABLE VI

| Time of measurement | 19½ h | 31½ h | 43½ h | 55½ h | 67½ h | 79½ h |
|---|---|---|---|---|---|---|
| Equivalent octane number | 118.3 | 116.8 | 117.2 | 112.3 | 116.45 | 118.9 |
| Liquid yield | 63.7 | 65.7 | 66.4 | 69.0 | 69.2 | 65.0 |

It is apparent from this table that the performance of catalyst IV is very good, particularly in view of the fact that the temperature of the conversion was maintained throughout the test at 480° C., which is a rather low temperature for hydroreforming reactions.

We claim:

1. An improved platinum-containing catalyst for the hydrotreatment of hydrocarbons consisting essentially of the following:
   a refractory mineral oxide carrier;
   from about 0.4 to about 2% of halogen, present in combined form with other catalyst components;
   from about 0.02 to about 2% of at least one platinum-group metal ingredient;
   from about 0.02 to about 2% of at least one additional manganese ingredient; and
   from about 0.02 to about 2% of a tin ingredient; said weight percentages being calculated with respect to the elemental form and based on the total catalyst weight.

2. A catalyst according to claim in sulfurized form and containing from about 0.05 to about 0.5% of sulfur based on the total catalyst weight.

3. A catalyst according to claim 1, wherein the platinum-group metal ingredient is only a platinum ingredient.

4. A catalyst for hydroreforming according to claim 3, wherein the halogen incorporated in the catalyst is chlorine.

5. A catalyst according to claim 4, the carrier is an alumina whose specific surface is between 100 and 350 m²/gram.

6. A catalyst according to claim 5 wherein the content of said platinum-group metal ingredient is from 0.1 to 0.7%, of said manganese ingredient is from 0.02 to 0.6%, and of tin is from 0.05 to 1.0%.

7. A catalyst according to claim 6 in sulfurized form and containing from 0.05 to 0.5% of sulfur based on the total catalyst weight.

8. A catalyst according to claim 1, wherein said carrier has a specific surface greater than 15 m² per gram and a specific pore volume greater than 0.1 cm³.

9. A catalyst according to claim 6 wherein the halogen content is between 0.5 and 1.6% based on the total catalyst weight.

10. A catalyst according to claim 1 wherein the platinum-group metal ingredient is only a platinum ingredient.

11. A catalyst according to claim 8, wherein the platinum-group metal ingredient is only a platinum ingredient.

12. A catalyst according to claim 1, wherein the halogen incorporated in the catalyst is chlorine.

13. A catalyst according to claim 1, wherein the carrier is an alumina whose specific surface is between 100 and 350 m²/gram.

14. A catalyst according to claim 10, the carrier is an alumina whose specific surface is between 100 and 350 m²/gram.

15. A catalyst according to claim 1 wherein the content of said platinum-group metal ingredient is from 0.1 to 0.7%, of said manganese ingredient is from 0.02 to 0.6%, and of tin is from 0.05 to 1.0%.

16. In a process for the preparation of a hydrotreatment catalyst having a porous refractory mineral oxide carrier and a halogen in combined form with other catalyst components of between about 0.4 and 2% and the following:

from about 0.02 to about 2% of at least one platinum-group metal ingredient;

from about 0.02 to about 2% of at least one additional ingredient;

from about 0.02 to about 2% of a tin ingredient;

said weight percentages being calculated with respect to the elemental form and based on the total catalyst weight;

and comprising at least one impregnation of the porous carrier with at least one solution containing at least one of said additional ingredients, a halogen compound, a platinum-group metal, or tin, the improvement wherein said additional ingredient is of manganese, and the incorporation of said ingredient onto said carrier comprises at least one of the impregnating solutions containing cations or anions containing the element manganese.

17. A process according to claim 16, the tin ingredient is deposited before the deposition of at least one of the platinum-group metal ingredient.

18. A process according to claim 16, wherein before or during the deposition of the platinum-group metal ingredient the carrier is treated with a hydrochloric acid solution.

19. A process for preparing a hydroreforming catalyst according to claim 16, wherein said carrier has a specific surface greater than 15 m² per gram and a specific pore volume greater than 0.1 cm³, is alumina, and the platinum-group metal ingredient is a platinum ingredient.

20. A process according to claim 19, wherein the halogen incorporated in the catalyst is chlorine.

21. A process according to claim 20 further comprising after deposition of the ingredients other than the platinum-group ingredients, a calcination at a temperature between 400 and 700° C. then, following the deposition of at least one of the platinum-group ingredients, a calcination at a temperature under 530° C., and a reduction with hydrogen.

22. A process according to claim 16 further comprising after deposition of the ingredients other than the platinum-group ingredients, a calcination at a temperature between 400° and 700° C. then, following the deposition of at least one of the platinum-group ingredients, a calcination at a temperature under 530° C., and a reduction with hydrogen.

23. A process according to claim 22 further comprising after reduction, a sulfurization of the catalyst with sulfurized hydrogen, low molecular-weight mercaptans, or organic sulfurs.

24. A process according to claim 21 wherein said first calcination is between 500° and 600° C. and further comprising after reduction, a sulfurization of the catalyst with sulfurized hydrogen, low molecular-weight mercaptans, or organic sulfurs.

25. A process according to claim 24 wherein before or during the deposition of the platinum the carrier is treated with a hydrochloric acid solution.

* * * * *

UNITED STATES PATENT AND TRADEMARK OFFICE
CERTIFICATE OF CORRECTION

PATENT NO. : 4,111,841
DATED : September 5, 1978
INVENTOR(S) : Joseph-Edouard Weisang; Philippe Engelhard It is certified that error appears in the above-identified patent and that said Letters Patent are hereby corrected as shown below:

Claim 2, line 47, insert --1-- after "claim".

*Signed and Sealed this*

*Twenty-second* Day of *May 1979*

[SEAL]

Attest:

RUTH C. MASON
*Attesting Officer*

DONALD W. BANNER
*Commissioner of Patents and Trademarks*